US011503103B2

(12) United States Patent
Tilney et al.

(10) Patent No.: US 11,503,103 B2
(45) Date of Patent: Nov. 15, 2022

(54) USING A SMART LINK TO ACCESS A DIGITAL RESOURCE

(71) Applicant: VMware, Inc., Palo Alto, CA (US)

(72) Inventors: Scott Tilney, San Jose, CA (US); Stephen Schmidt, Portola Valley, CA (US); Gary Grossi, San Jose, CA (US); Michelle Lee, Berkeley, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/154,284

(22) Filed: Jan. 21, 2021

(65) Prior Publication Data
US 2022/0038524 A1 Feb. 3, 2022

Related U.S. Application Data

(60) Provisional application No. 63/058,276, filed on Jul. 29, 2020.

(51) Int. Cl.
*H04L 67/02* (2022.01)
*H04L 9/40* (2022.01)
*H04L 67/306* (2022.01)
*H04L 67/01* (2022.01)

(52) U.S. Cl.
CPC .......... *H04L 67/02* (2013.01); *H04L 63/0876* (2013.01); *H04L 63/101* (2013.01); *H04L 67/01* (2022.05); *H04L 67/306* (2013.01)

(58) Field of Classification Search
CPC ....... H04L 67/02; H04L 67/306; H04L 67/42; H04L 63/0876; H04L 63/101
See application file for complete search history.

(56) References Cited

U.S. PATENT DOCUMENTS

| | | | |
|---|---|---|---|
| 7,401,115 B1 | 7/2008 | Arsenault | |
| 9,641,610 B2 | 5/2017 | Maeng | |
| 9,934,394 B1 | 4/2018 | Stolboushkin | |
| 10,831,452 B1 | 11/2020 | Hunter | |
| 11,115,485 B2 | 9/2021 | Bravo Avina | |
| 2002/0116459 A1 | 8/2002 | Zuberec et al. | |
| 2003/0083948 A1 | 5/2003 | Rodriguez et al. | |
| 2009/0014519 A1 | 1/2009 | Singh et al. | |
| 2010/0153495 A1 | 6/2010 | Barger et al. | |
| 2011/0276396 A1 | 11/2011 | Rathod | |
| 2012/0221724 A1 | 8/2012 | Chor | |
| 2014/0359069 A1* | 12/2014 | Matute | H04W 12/08 709/229 |
| 2015/0032824 A1 | 1/2015 | Kumar et al. | |
| 2015/0213238 A1 | 7/2015 | Farha | |
| 2015/0334080 A1 | 11/2015 | Tamayo | |
| 2016/0012465 A1 | 1/2016 | Sharp | |
| 2019/0205555 A1 | 7/2019 | Duffy et al. | |
| 2020/0142549 A1 | 5/2020 | Kaplan et al. | |
| 2020/0142750 A1 | 5/2020 | Kaplan et al. | |
| 2020/0202066 A1 | 6/2020 | Bodera et al. | |

(Continued)

*Primary Examiner* — El Hadji M Sall

(57) ABSTRACT

In a method for using a smart link to access a digital resource, a smart link access request is received from an electronic device interacting with a smart link, wherein a smart link provides access to at least one destination digital resource of a plurality of destination digital resources associated with the smart link. The at least one destination digital resource to access is determined based at least on the smart link access request. The electronic device is directed to the determined at least one destination digital resource.

20 Claims, 6 Drawing Sheets

(56) References Cited

U.S. PATENT DOCUMENTS

| | | |
|---|---|---|
| 2020/0244649 A1 | 7/2020 | Zou |
| 2020/0258061 A1 | 8/2020 | Beadles et al. |
| 2021/0014729 A1 | 1/2021 | Raghavan et al. |
| 2021/0192505 A1 | 6/2021 | Xu |

* cited by examiner

USING A SMART LINK TO ACCESS A DIGITAL RESOURCE

RELATED APPLICATIONS

This application claims priority to and the benefit of U.S. Patent Provisional Patent Application 63/058,276, filed on Jul. 29, 2020, entitled "GENERATION AND USAGE OF SMARTLINKS," by Tilney et al., and assigned to the assignee of the present application, which is incorporated herein by reference in its entirety.

BACKGROUND

Digital resource linking systems allow for linking an outward-facing digital resource to an end (e.g., destination) digital resource. Examples of digital resource linking systems include uniform resource locator (URL) shortening, Quick Response (QR) codes, and Near-Field-Communication (NFC) tags. A URL is a digital resource that specifies a location of a website. URL shortening is a technique for converting a longer source URL into a shorter URL, while directing an access attempt to the original source URL. QR codes are two-dimensional barcodes that are machine-readable (e.g., by a smartphone camera) and can include information for linking to another digital resource (e.g., a URL, phone number, email address, etc.) NFC tags are small electronic devices that are machine-readable over a wireless connection (e.g., by an NFC-enabled smartphone) and can include information for linking to another digital resource (e.g., a URL, phone number, email address, etc.) For example, NFC tags can be embedded into posters, payment terminals, signs, etc.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
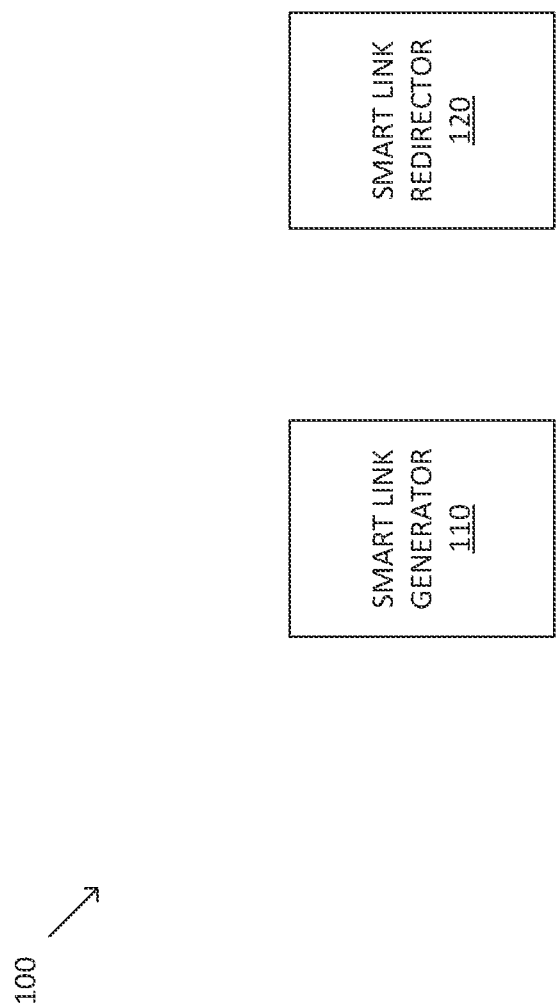
FIG. 1 is a block diagram illustrating an embodiment of an example system for generating and using smart links.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "determining," "identifying," "comparing," "generating," "executing," "configuring," "storing," "directing," "accessing," "updating," "collecting," or the like, refer to the actions and processes of an electronic computing device or system such as: a host processor, a processor, a memory, a cloud-computing environment, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions or code residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, code and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

OVERVIEW OF DISCUSSION

Discussion begins with a description of an example system for smart link generation and usage, according to various embodiments. An example computer system environment, upon which embodiments of the present invention may be implemented, is then described. Example operations of systems for smart link generation and usage are then described.

Digital resource linking systems allow for linking an outward-facing digital resource to an end (e.g., destination) digital resource. Examples of digital resource linking systems include uniform resource locator (URL) shortening, Quick Response (QR) codes, and Near-Field-Communication (NFC) tags. A URL is a digital resource that specifies a location of a website. URL shortening is a technique for converting a longer source URL into a shorter URL, while directing an access attempt to the original source URL. QR codes are two-dimensional barcodes that are machine-readable (e.g., by a smartphone camera) and can include information for linking to another digital resource (e.g., a URL, phone number, email address, etc.) NFC tags are small electronic devices that are machine-readable over a wireless connection (e.g., by an NFC-enabled smartphone) and can include information for linking to another digital resource (e.g., a URL, phone number, email address, etc.) For example, NFC tags can be embedded into posters, payment terminals, signs, etc.

In general, conventional digital resource linking systems (e.g., URL shorteners, QR codes, and NFC tags) are limited in that they only allow for linking exactly one outward facing resource (e.g., a shortened URL) to exactly one destination digital resource. Other conventional digital resource linking systems may allow for the linking of multiple resources (e.g., a QR code and a shortened URL) to a single resource. Specifically, conventional digital resource linking systems only allow for the linking to a single accessible end resource. Moreover, conventional digital resource linking systems are typically fixed and unchangeable, requiring a constant end digital resource.

Example embodiments described herein improve the performance of computer systems by supporting the generation and usage of links (e.g., QR codes, NFC tags, and shortened URLs) between digital resources, wherein these links are collectively referred to herein as "smart links." For purposes of brevity and clarity, the following description refers to smart links, it will be understood that embodiments of the present invention are directed to the use of QR codes, NFC tags, shortened URLs, or other types of linkages between digital resources.

Embodiments herein provide access to a single accessible digital resource (e.g., URL, QR code, NFC tag) that can point to a variety of digital resources (e.g., email, another URL, phone number, contact card, meeting invite, etc.) In some embodiments, each digital resource is captured as an entity that can be directed to multiple different resource type from a single or multiple smart links (e.g., QR Codes or URLs). For example, a single QR code can point to multiple resource types such as an email address, phone number, and contact card.

Other embodiments described herein provide for combining restrictions and/or conditions when accessing an exposed smart link. For example, when exposing a resource such as QR code or shortened URL sometimes it is necessary to direct the incoming request to different resources based on information about the requestor. Embodiments herein allow for one or more conditions for accessing destination digital resources that control redirection of based on a given criteria. Embodiments described herein also allow for restrictions on accessing destination digital resources by blocking incoming request based on given criteria.

Other embodiments described herein provide for collection and generation of multi-dimensional metrics for cross-medium information resources related to usage and access of a deployed outward facing resource (e.g., a smart link). These embodiments allow for the presentation and viewing of the overall usage of a deployed outward facing resource using detailed metrics that show, e.g., the usage of each resource, each medium, as well as additional condition-based criteria. The described embodiments provide a way to view data based on, not only how each resource performed (clicks, scans, etc.) but also gives a breakdown of the medium it was interacted with. In addition to that it can account for different user defined conditions (such as location, platform, etc.)

Other embodiments described herein provide for allowing digital resource access in and out of a protected network. For example, entities that have secure enterprise networks with sensitive data prefer not to put internal URL on to third party URL and QR Code generation services since it is a security risk. However, only utilizing internal services limits the ability to use them to market and share the data you want to be external. Embodiments described herein allow for an on premise QR Code and shortened URL service that can be used securely for internal only links that will not be accessible outside a company's network while simultaneously enable public facing resources to be created and distributed securely.

Accordingly, embodiments of the present invention amount to significantly more than merely using a computer to generate and use a QR code, NFC tag, or shortened URL. Instead, embodiments of the present invention specifically recite novel processes, rooted in computer technology, for generating smart links that are configured to be linked to more than one destination digital resource, that provide restrictions and/or conditions on a smart link access for accessing a linked digital resource, that provide access to multidimensional metrics based on interactions with linked digital resources, and allow for accessing digital resources in and out of protected networks, thereby improving performance of a computer system and linked digital resources, to overcome a problem specifically arising in the realm of digital resource linkage systems.

Example System for Smart Link Generation and Usage

Example embodiments described herein provide systems and methods for generating and using smart links for directing electronic devices to destination digital resources. In some embodiments, methods and systems for generating a plurality of smart links is provided. A plurality of destination digital resources is received. At least one smart link is generated based on the plurality of destination digital resources, wherein the at least one smart link provides configurable access to the plurality of destination digital resources in response to an interaction with the at least one smart link.

In some embodiments, methods and systems for using a smart link to access a plurality of digital resources is provided. A smart link access request is received from an electronic device interacting with a smart link, wherein a smart link provides access to at least one destination digital resource of a plurality of destination digital resources associated with the smart link. The at least one destination digital resource to access is determined based at least on the smart link access request. The electronic device is directed to the determined at least one destination digital resource.

FIG. 1 is a block diagram illustrating an embodiment of a system 100 for generating and using smart links. For purposes of the instant description, the term "smart link" collectively refers to at least one of a QR code, an NFC tag, a shortened URL, or any other type of linkage between digital resources. System 100 includes smart link generator 110 for generating smart links and smart link redirector 120 for redirecting smart links to the appropriate destination digital resources. It should be appreciated that components of system 100 can be collocated or distributed over a network of computing devices. It should be appreciated that smart link generator 110 and smart link redirector 120 can be under the control of a single component of an enterprise computing environment (e.g., a virtualization infrastructure or computer system 400) or can be distributed over multiple components (e.g., a virtualization infrastructure or a cloud-based infrastructure). In some embodiments, system 100 is comprised within or is an enterprise system.

Embodiments described herein provide access to a single digital resource (e.g., shortened URL or QR code) that can point to a variety of resource types (e.g., email, another URL, phone number, contact card, meeting invite, etc.) In some embodiments, multiple digital resources can be provided for accessing multiple destinations resources. In some embodiments, each resource is captured as an entity that can be directed to multiple different resource type from a single or multiple smart links (e.g., QR Code or shortened URLs). For example, a single QR code point to an email address, phone number, and contact card.

Conventional solutions allow for linking exactly one outward facing resource (e.g., a shortened URL) to exactly one destination resource. Other conventional solutions allow for linking multiple resources (e.g., a QR code and shortened URL) to a single resource. Embodiments described herein allows the linking of multiple outward facing resources, referred to herein as smart links, to multiple end resources.

Figure 2:
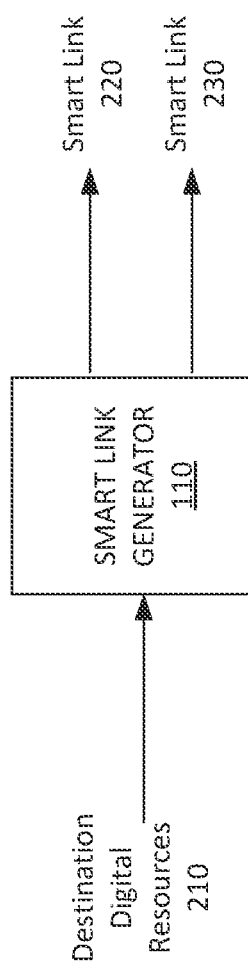
FIG. 2 is a block diagram illustrating an example smart link generator for generating smart links, according to an embodiment.

FIG. 2 is a block diagram illustrating an example smart link generator 110 for generating smart links, according to an embodiment. Smart link generator 110 is configured to receive a plurality of destination digital resources 210 (e.g., an email address, a website, a phone number, etc.) and generate at least one smart link 220 based on the at least one destination digital resource. In some embodiments, smart link generator 110 is configured to generate a plurality of smart links, e.g., smart link 220 and smart link 230.

In some embodiments, smart link generator 110 is operable to configure access to destination digital resources 210 in response to an interaction with smart link 220. In some embodiments, smart link generator 110 configures configuration settings for controlling access to destination digital resources 210 in response to an interaction with smart link 220.

For example, destination digital resources 210 may include a first destination digital resource for a device executing Apple's iOS operating system and a second destination digital resource for a device executing Google's Android operating system. Smart link generator 110 generates a single smart link 220 that is associated with both destination digital resources 210. Smart link generator 110 generates configuration settings such that in response to receiving an access request associated with an interaction with smart link 220, the electronic device interacting with smart link 220 is directed to the appropriate destination digital resources 210 (e.g., an iOS device is directed to the iOS destination digital resource and an Android device is directed to the Android destination digital resource), where both destination digital resources are associated with smart link 220.

In some embodiments, multiple smart links (e.g., smart link 220 and smart link 230) are generated in response to receiving destination digital resources 210. For example, a QR code that is linked to destination digital resources 210 and an NFC tag that is linked to destination digital resources 210 are both generated.

In one embodiment, the configuration settings provide access to one destination digital resource of the plurality of destination digital resources in response to an interaction with the at least one smart link. In another embodiment, the configuration settings provide access to the plurality of destination digital resources in response to an interaction with the at least one smart link.

Embodiments described herein provide a system that allows the combination of conditions (redirection based on given criteria) and restrictions (the blocking of incoming requests based on given criteria). In some embodiments, the configuration settings provide access to at least one destination digital resource of the plurality of destination digital resources in response to an interaction with the at least one smart link and based on a time of day of the interaction. In some embodiments, the configuration settings provide access to at least one destination digital resource of the plurality of destination digital resources in response to an interaction with the at least one smart link and based on information about a device interacting with the at least one smart link. In some embodiments, the configuration settings provide access to at least one destination digital resource of the plurality of destination digital resources in response to an interaction with the at least one smart link and based on a location of the interaction.

Figure 3:
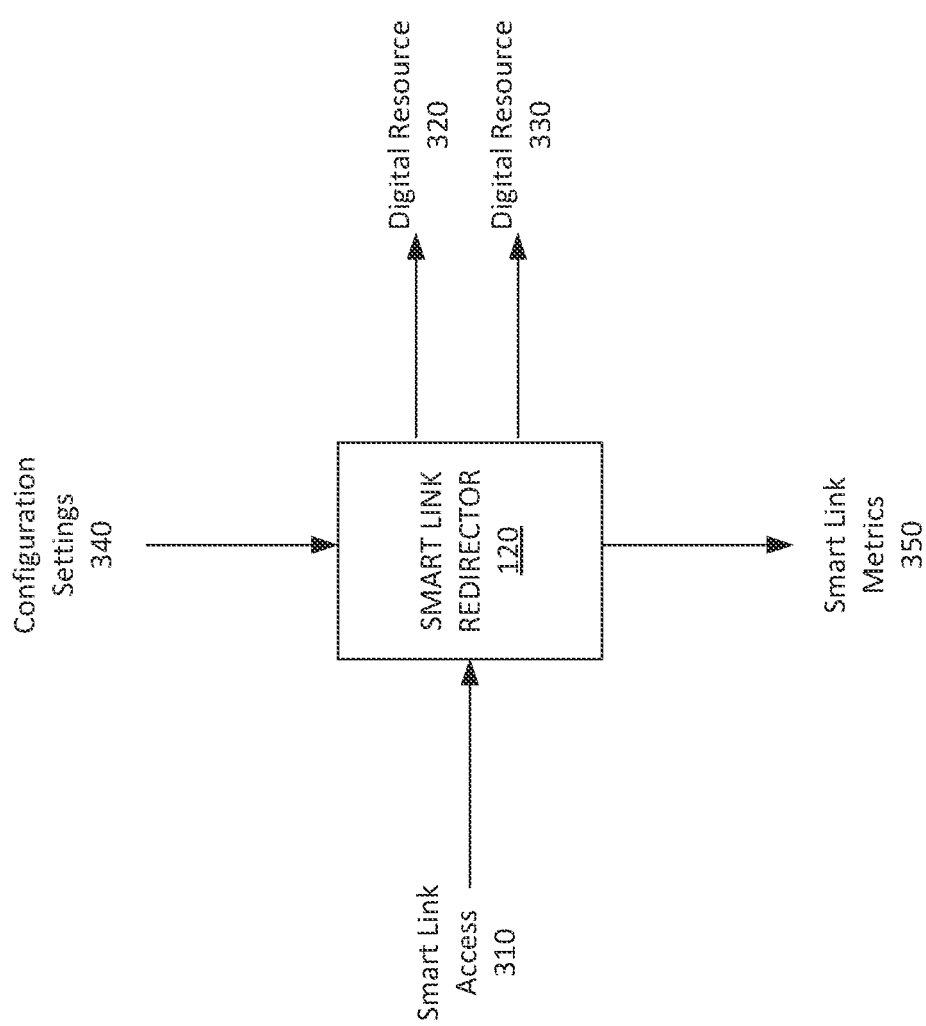
FIG. 3 is a block diagram illustrating an example smart link redirector for redirecting smart links to the appropriate destination digital resources, according to an embodiment.

FIG. 3 is a block diagram illustrating an example smart link redirector 120 for redirecting smart links to the appropriate destination digital resources, according to an embodiment. Smart link redirector 120 is configured to receive a smart link access 310 and to redirect the device from which the smart link access 310 was received to the appropriate digital resource 320 and/or digital resource 330. It should be appreciated that smart link access 310 is dependent on the resource type of smart link access 310. For example, smart link access 310 can be an electronic device interacting with a QR code, an NFC tag, or a shortened URL.

Smart link redirector 120 is also configured to received configuration settings 340 for controlling how smart link redirector 120 redirects a smart link access 310, collects smart link metrics 350, or configures other aspects of smart link redirector 120.

Smart links are easy ways for people to share and access digital resources. Embodiments described herein provides for the generation and usage of smart links that have dynamic properties without changing the smart links themselves. For instance, embodiments described herein provide for decoupling the physical resource and information by mapping digital resources to physical resources. Embodiments described herein provide for the generating and usage of smart links that can be linked to multiple destination digital resources.

For example, the smart links described herein are dynamically updatable, access limits to the destination digital resource can be set, and users can be dynamically redirected to appropriate or predetermined destination digital resources. For example, a single smart link for accessing a smartphone app can direct users having an Apple iPhone to the Apple app store for downloading the iOS-compatible version of the app and can direct users having an Android phone to the Google app store for downloading the Android-compatible version of the app.

In one embodiment, system 100 is configured to generate two smart links for the one or more destination digital resources. For example, smart link generator 110 generates a shortened URL and a QR code for the linked digital resource(s). For instance, the longer a source URL, the more complex the QR code can get, resulting in a QR code that is less tolerant to scanning at a distance, physical damage, speed of scan, etc. In some embodiments, the URL is first shortened to a shortened URL, and then the shortened URL is encoded into a QR code, making it easier to scan.

In some embodiments, smart link generator 110 is configured to generate the shortened URL and the QR code at the same time or in the same transaction/operation.

In some embodiments, system 100 is operable to dynamically change the destination digital resource of a smart link without changing the smart link itself. For example, configuration settings 340 may be received that change a destination digital resource (e.g., updating a destination web address) without changing the smart link itself.

In some embodiments, scan (e.g., access) limits may be placed on a smart link. For example, a smart link may have a limited number of times it can be accessed.

In some embodiments, a smart link may have an associated access code (e.g., PIN), requiring a user to enter the access code to access the destination digital resource.

In some embodiments, a smart link may have associated time/date conditions. Embodiments herein allow for one or more conditions for accessing destination digital resources that control redirection of based on a date and/or time of the access. For example, the request can be routed to a different digital resource based on the date and or time of the access attempt.

In some embodiments, a smart link may have associated time/date restrictions. Embodiments described herein also allow for restrictions on accessing destination digital resources by blocking incoming request based on a date and/or time of the access attempt. For example, the request can be blocked based on the date and or time of the access attempt.

In some embodiments, a smart link may have associated location conditions. Embodiments herein allow for one or more conditions for accessing destination digital resources that control redirection of based on a location of the access. For example, the location of the access attempt can be determined from information within a header (e.g., an http header) of the access attempt. For example, the access request can be routed based on location such that a user in the U.S. can be routed to a U.S. version of a website while a user in Canada can be routed to a Canadian version of the website.

In some embodiments, a smart link may have associated location restrictions. Embodiments described herein also allow for restrictions on accessing destination digital resources by blocking incoming request based on a location of the access attempt. For example, the request can be blocked based on the location of the access attempt.

In some embodiments, a smart link may have associated device conditions. Embodiments herein allow for one or more conditions for accessing destination digital resources that control redirection of based on a location of the access. For example, the location of the access attempt can be determined from information within a header (e.g., an http header) of the access attempt. For example, a single smart link for accessing a smartphone app can direct users having an Apple iPhone to the Apple app store for downloading the iOS-compatible version of the app and can direct users having an Android phone to the Google app store for downloading the Android-compatible version of the app.

In some embodiments, a smart link may have associated device restrictions. Embodiments described herein also allow for restrictions on accessing destination digital resources by blocking incoming request based on a device of the access attempt. For example, the request can be blocked based on the device of the access attempt.

In some embodiments, a scan of a smart link for an emergency telephone number can automatically redirect the smart link access to an emergency number for the location of the request. For example, different countries or regions may have different emergency telephone numbers. Moreover, these emergency numbers may have device restrictions (e.g., not available on mobile phones). The described embodiment automatically routes a smart link access to the local emergency call center. In some embodiments, the smart link may be a QR code printed on a keychain or a keychain including an NFC tag for emergency services.

In some embodiments, where the smart link is a QR code, the color of the QR code (one or both of the QR code foreground and background) can be changed or customized.

In some embodiments, the described system provides for application deep-linking. Some applications (e.g., mobile applications) are automatically launchable and at least one field is prepopulated, according to the functionality of the application itself, by accessing a smart link. In such embodiments, the deep-linking itself is not controlled, but rather the smart link abstracts this functionality by associating it with the smart link.

In some embodiments, the described system allows for the disabling of a smart link (e.g., similar to a global restriction). In some embodiments, disabling a smart link can automatically redirect the smart link to a particular digital resource.

In some embodiments, the described system provides enhanced security by obscuring what might otherwise be private information. For example, some URLs can include secret or proprietary information. By encoding the URL into a shortened URL (e.g., prior to also encoding in to a OR code or NFC tag), the privacy of such date can be maintained.

In some embodiments, the smart link can be redirected to a phone number or email address without encoding the phone number or email address into the smart link. For example, the phone number or email address can be included in configuration settings maintained in system 100, and a smart link access can be redirected to the phone number or email address in response to an access of the smart link.

In some embodiments, a smart link is automatically generated in response to uploading of a file. For example, if a user wants to share a document (e.g., an audio file, a video file, a .pdf file, etc.), the document is uploaded and a smart link (e.g., a OR code) is automatically generated, wherein an access of the smart link results in an automatic retrieval of the uploaded document.

In some embodiments, system 100 is configured to collect and provide smart link metrics 350 for cross-medium information resources related to usage and access of a deployed outward facing resource (e.g., a smart link). These embodiments allow for the presentation and viewing of the overall usage of a deployed outward facing resource using detailed metrics that show, e.g., the usage of each resource, each medium, as well as additional condition-based criteria. The described embodiments provide a way to view data based on, not only how each resource performed (clicks, scans, etc.) but also gives a breakdown of the medium it was interacted with. In addition to that it can account for different user defined conditions (such as location, platform, etc.) The metrics are multi-dimensional, in that they can provide information based on device type (e.g., Android, iOS), smart link type (e.g., QR code, NFC tag, shortened URL), time, date, location, etc.

In some embodiments, the described system allows for multiple smart links for a single resource. For example, it is possible to track engagement of resource based on physical location of the smart link. In an example use case, multiple posters advertising a conference can be place around a campus, where each poster includes a unique QR code that directs to the same website. The content is the same, but the location of access is different and can be tracked as a metric.

Figure 4:
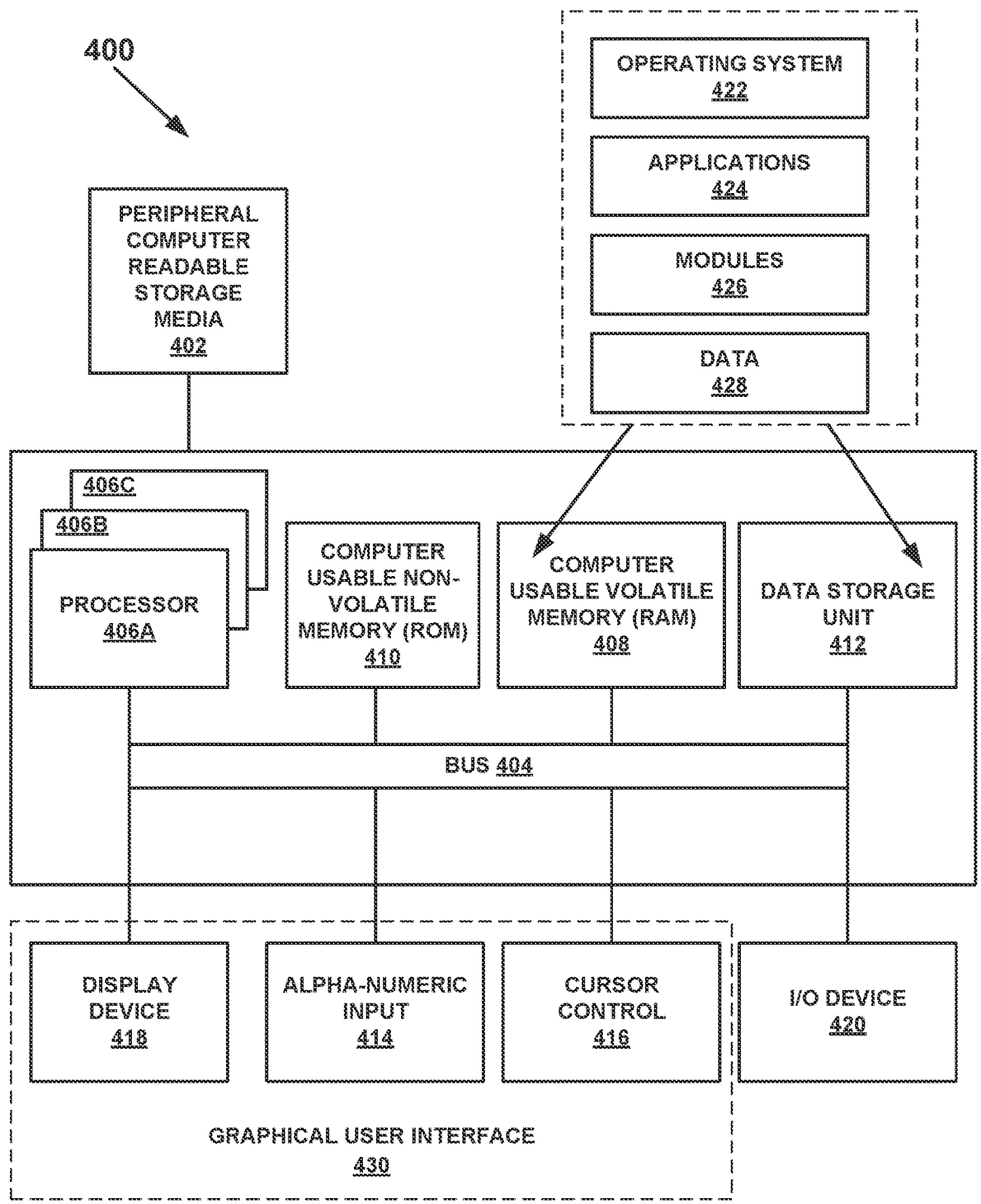
FIG. 4 is a block diagram of an example computer system upon which embodiments of the present invention can be implemented.

FIG. 4 is a block diagram of an example computer system 400 upon which embodiments of the present invention can be implemented. FIG. 4 illustrates one example of a type of computer system 400 (e.g., a computer system) that can be used in accordance with or to implement various embodiments which are discussed herein.

It is appreciated that computer system 400 of FIG. 4 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, computer system 400 of FIG. 4 is well adapted to having peripheral tangible computer-readable storage media 402 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 400 of FIG. 4 includes an address/data bus 404 for communicating information, and a processor 406A coupled with bus 404 for processing information and instructions. As depicted in FIG. 4, computer system 400 is also well suited to a multi-processor environment in which a plurality of processors 406A, 406B, and 406C are present. Conversely, computer system 400 is also well suited to having a single processor such as, for example, processor 406A. Processors 406A, 406B, and 406C may be any of various types of microprocessors. Computer system 400 also includes data storage features such as a computer usable volatile memory 408, e.g., random access memory (RAM), coupled with bus 404 for storing information and instructions for processors 406A, 406B, and 406C. Computer system 400 also includes computer usable non-volatile memory 410, e.g., read only memory (ROM), coupled with bus 404 for storing static information and instructions for processors 406A, 406B, and 406C. Also present in computer system 400 is a data storage unit 412 (e.g., a magnetic or optical disc and disc drive) coupled with bus 404 for storing information and instructions. Computer system 400 also includes an alphanumeric input device 414 including alphanumeric and function keys coupled with bus 404 for communicating information and command selections to processor 406A or processors 406A, 406B, and 406C. Computer system 400 also includes an cursor control device 416 coupled with bus 404 for communicating user input information and command selections to processor 406A or processors 406A, 406B, and 406C. In one embodiment, computer system 400 also includes a display device 418 coupled with bus 404 for displaying information.

Referring still to FIG. 4, display device 418 of FIG. 4 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 416 allows the computer user to dynamically signal the movement of a visible symbol (cursor) on a display screen of display device 418 and indicate user selections of selectable items displayed on display device 418. Many implementations of cursor control device 416 are known in the art including a trackball, mouse, touch pad, touch screen, joystick or special keys on alphanumeric input device 414 capable of signaling movement of a given direction or manner of displacement. Alternatively, it will be appreciated that a cursor can be directed and/or activated via input from alphanumeric input device 414 using special keys and key sequence commands. Computer system 400 is also well suited to having a cursor directed by other means such as, for example, voice commands. In various embodiments, alphanumeric input device 414, cursor control device 416, and display device 418, or any combination thereof (e.g., user interface selection devices), may collectively operate to provide a graphical user interface (GUI) 430 under the direction of a processor (e.g., processor 406A or processors 406A, 406B, and 406C). GUI 430 allows user to interact with computer system 400 through graphical representations presented on display device 418 by interacting with alphanumeric input device 414 and/or cursor control device 416.

Computer system 400 also includes an I/O device 420 for coupling computer system 400 with external entities. For example, in one embodiment, I/O device 420 is a modem for enabling wired or wireless communications between computer system 400 and an external network such as, but not limited to, the Internet. In one embodiment, I/O device 420 includes a transmitter. Computer system 400 may communicate with a network by transmitting data via I/O device 420.

Referring still to FIG. 4, various other components are depicted for computer system 400. Specifically, when present, an operating system 422, applications 424, modules 426, and data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer-readable storage media.

Example Methods of Operation

Figure 5:
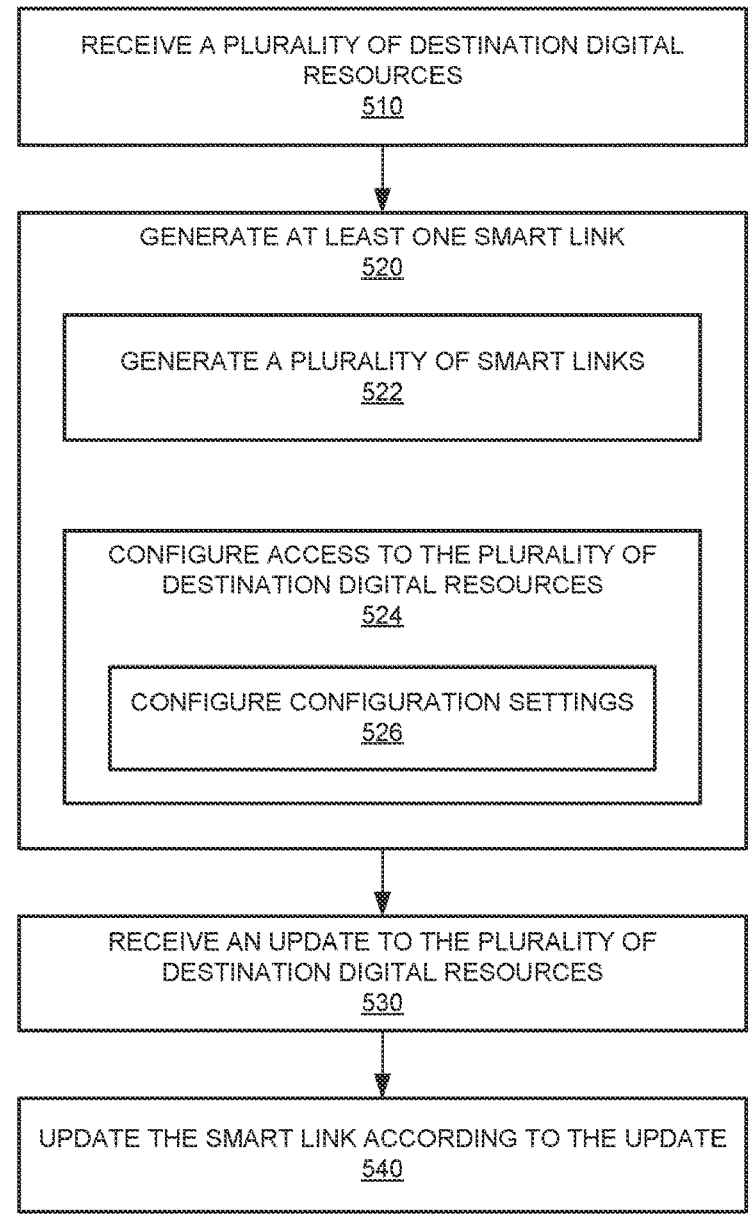
FIG. 5 is a flow diagram illustrating an example method for generating at least one smart link, in accordance with embodiments.
Figure 6:
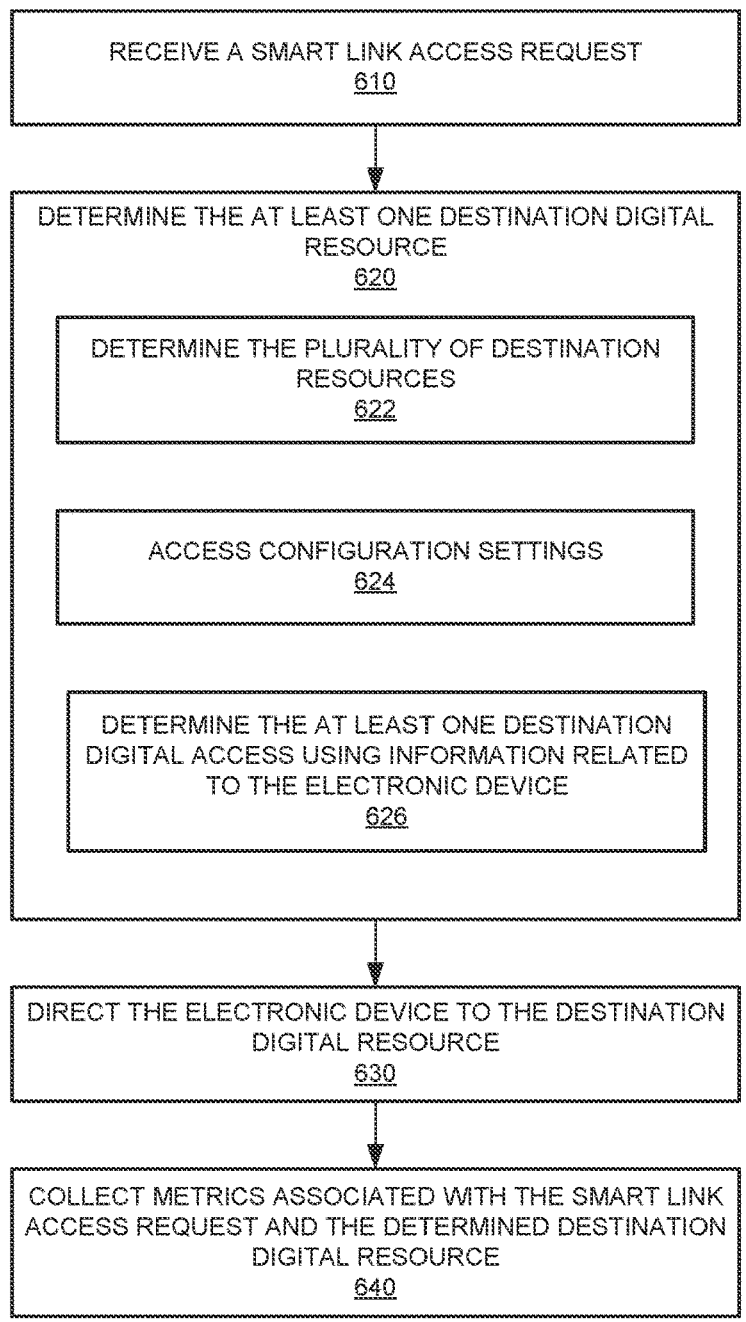
FIG. 6 is a flow diagram illustrating an example method for using a smart link, in accordance with embodiments.

The following discussion sets forth in detail the operation of some example methods of operation of embodiments. With reference to FIGS. 5 and 6, flow diagrams 500 and 600 illustrate example procedures used by various embodiments. The flow diagrams include some procedures that, in various embodiments, are carried out by a processor under the control of computer-readable and computer-executable instructions. In this fashion, procedures described herein and in conjunction with the flow diagrams are, or may be, implemented using a computer, in various embodiments.

The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 400). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in the flow diagrams may be performed in an order different than presented and/or not all of the procedures described in the flow diagrams may be performed. It is further appreciated that procedures described in the flow diagrams may be implemented in hardware, or a combination of hardware with firmware and/or software provided by computer system 400.

FIG. 5 is a flow diagram 500 illustrating an example method for generating at least one smart link, in accordance with embodiments. At procedure 510 of flow diagram 500, a plurality of destination digital resources is received. At procedure 520, at least one smart link is generated based on the plurality of destination digital resources, wherein the at least one smart link provides configurable access to the plurality of destination digital resources in response to an interaction with the at least one smart link. In accordance with various embodiments, the at least one smart link includes at least one of a Quick Response (QR) code, a Near-Field-Communication (NFC) tag, and a shortened uniform resource locator (URL). In one embodiment, as shown at procedure 522, a plurality of smart links is generated based on the plurality of destination digital resources, wherein the plurality of smart links comprises smart links of at least two different types.

In one embodiment, as shown at procedure 524, access to the plurality of destination digital resources in response to an interaction with the at least one smart link is configured. In one embodiment, as shown at procedure 526, configuration settings for controlling access to the plurality of destination digital resources in response to an interaction with the at least one smart link are configured.

In one embodiment, the configuration settings provide access to one destination digital resource of the plurality of destination digital resources in response to an interaction with the at least one smart link. In another embodiment, the configuration settings provide access to the plurality of destination digital resources in response to an interaction with the at least one smart link.

In some embodiments, the configuration settings provide access to at least one destination digital resource of the plurality of destination digital resources in response to an interaction with the at least one smart link and based on a time of day of the interaction. In some embodiments, the configuration settings provide access to at least one destination digital resource of the plurality of destination digital resources in response to an interaction with the at least one smart link and based on information about a device interacting with the at least one smart link. In some embodiments, the configuration settings provide access to at least one destination digital resource of the plurality of destination digital resources in response to an interaction with the at least one smart link and based on a location of the interaction.

In one embodiment, as shown at procedure 530, an update to the plurality of destination digital resources associated with the at least one smart link is received. At procedure 540, the at least one smart link is updated to direct an interaction with the at least one smart link according to the update.

FIG. 6 is a flow diagram 600 illustrating an example method for using a smart link to access a digital resource, in accordance with embodiments. At procedure 610 of flow diagram 600, a smart link access request from an electronic device interacting with a smart link is received, wherein a smart link provides access to at least one destination digital resource of a plurality of destination digital resources associated with the smart link. In some embodiments, the smart link includes at least one of a Quick Response (QR) code, a Near-Field-Communication (NFC) tag, and a shortened uniform resource locator (URL). In some embodiments, the smart link access request includes information related to the electronic device.

At procedure 620, the at least one destination digital resource to access based at least on the smart link access request is determined. In one embodiment, as shown at procedure 622, the plurality of destination digital resources to access is determined based at least on the smart link access request. In one embodiment, as shown at procedure 624, configuration settings for controlling access to the at least one destination digital resource indicated by the smart link access request are accessed.

In accordance with various embodiments, as shown at procedure 626, the information related to the electronic device is used to determine the at least one destination digital resource. In one embodiment, where the information related to the device includes a type of the electronic device, the at least one destination digital resource to access is determined based at least on the smart link access request and the type of the electronic device. In one embodiment, where the information related to the device includes a location of the electronic device, the at least one destination digital resource to access is determined based at least on the smart link access request and the location of the electronic device. In one embodiment, where the information related to the device includes a time, the at least one destination digital resource to access is determined based at least on the smart link access request and the time.

At procedure 630, the electronic device is directed to the determined at least one destination digital resource. In one embodiment, as shown at procedure 640, metrics associated with the smart link access request and the determined at least one destination digital resource are collected.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for using a smart link to access a digital resource, the method comprising:
   receiving a smart link access request from an electronic device interacting with a smart link, wherein a smart link provides access to at least one destination digital resource of a plurality of destination digital resources associated with the smart link;
   determining the at least one destination digital resource to access based at least on the smart link access request; and
   directing the electronic device to the determined at least one destination digital resource.

2. The method of claim 1, wherein the determining the at least one destination digital resource to access based at least on the smart link access request comprises:
   determining the plurality of destination digital resources to access based at least on the smart link access request.

3. The method of claim 1, wherein the smart link comprises at least one of a Quick Response (QR) code, a Near-Field-Communication (NFC) tag, and a shortened uniform resource locator (URL).

4. The method of claim 1, wherein the determining the at least one destination digital resource to access based at least on the smart link access request comprises:
   accessing configuration settings for controlling access to the at least one destination digital resource indicated by the smart link access request.

5. The method of claim 1, wherein the smart link access request comprises information related to the electronic device.

6. The method of claim 5, wherein the information related to the electronic device comprises a type of the electronic device, wherein the determining the at least one destination digital resource to access based at least on the smart link access request comprises:
   determining the at least one destination digital resource to access based at least on the smart link access request and the type of the electronic device.

7. The method of claim 5, wherein the information related to the electronic device comprises a location of the electronic device, wherein the determining the at least one destination digital resource to access based at least on the smart link access request comprises:
   determining the at least one destination digital resource to access based at least on the smart link access request and the location of the electronic device.

8. The method of claim 5, wherein the information related to the electronic device comprises a time, wherein the determining the at least one destination digital resource to access based at least on the smart link access request comprises:

determining the at least one destination digital resource to access based at least on the smart link access request and the time.

9. The method of claim 1, further comprising:
collecting metrics associated with the smart link access request and the determined at least one destination digital resource.

10. A non-transitory computer readable storage medium having computer readable program code stored thereon for causing a computer system to perform a method for using a smart link to access a digital resource, the method comprising:
receiving a smart link access request from an electronic device interacting with a smart link, wherein a smart link provides access to at least one destination digital resource of a plurality of destination digital resources associated with the smart link, wherein the smart link access request comprises information related to the electronic device;
determining the at least one destination digital resource to access based at least on the smart link access request, wherein the determining the at least one destination digital resource to access based at least on the smart link access request comprises:
accessing configuration settings for controlling access to the at least one destination digital resource indicated by the smart link access request; and
directing the electronic device to the determined at least one destination digital resource.

11. The non-transitory computer readable storage medium of claim 10, wherein the determining the at least one destination digital resource to access based at least on the smart link access request comprises:
determining the plurality of destination digital resources to access based at least on the smart link access request.

12. The non-transitory computer readable storage medium of claim 10, wherein the smart link comprises at least one of a Quick Response (QR) code, a Near-Field-Communication (NFC) tag, and a shortened uniform resource locator (URL).

13. The non-transitory computer readable storage medium of claim 10, wherein the information related to the electronic device comprises a type of the electronic device, wherein the determining the at least one destination digital resource to access based at least on the smart link access request comprises:
determining the at least one destination digital resource to access based at least on the smart link access request and the type of the electronic device.

14. The non-transitory computer readable storage medium of claim 10, wherein the information related to the electronic device comprises a location of the electronic device, wherein the determining the at least one destination digital resource to access based at least on the smart link access request comprises:
determining the at least one destination digital resource to access based at least on the smart link access request and the location of the electronic device.

15. The non-transitory computer readable storage medium of claim 10, wherein the information related to the electronic device comprises a time, wherein the determining the at least one destination digital resource to access based at least on the smart link access request comprises:
determining the at least one destination digital resource to access based at least on the smart link access request and the time.

16. The non-transitory computer readable storage medium of claim 10, the method further comprising:
collecting metrics associated with the smart link access request and the determined at least one destination digital resource.

17. A computer system comprising:
a data storage unit; and
a processor coupled with the data storage unit, the processor configured to:
receive a smart link access request from an electronic device interacting with a smart link, wherein a smart link provides access to at least one destination digital resource of a plurality of destination digital resources associated with the smart link, wherein the smart link access request comprises information related to the electronic device;
determine the at least one destination digital resource to access based at least on the smart link access request;
access configuration settings for controlling access to the at least one destination digital resource indicated by the smart link access request; and
direct the electronic device to the determined at least one destination digital resource.

18. The computer system of claim 17, wherein the processor is further configured to:
determine the plurality of destination digital resources to access based at least on the smart link access request.

19. The computer system of claim 17, wherein the processor is further configured to:
determine the at least one destination digital resource to access based at least on the smart link access request and the type of the electronic device.

20. The computer system of claim 17, wherein the processor is further configured to:
determine the at least one destination digital resource to access based at least on the smart link access request and the location of the electronic device.

* * * * *